(12) United States Patent
Robert

(10) Patent No.: US 6,195,890 B1
(45) Date of Patent: Mar. 6, 2001

(54) METHOD OF MAKING A VALVE STEM

(75) Inventor: Raoul W. Robert, Baton Rouge, LA (US)

(73) Assignee: T & R Solutions, Inc., Prairieville, LA (US)

( * ) Notice: Subject to any disclaimer, the term of this patent is extended or adjusted under 35 U.S.C. 154(b) by 0 days.

(21) Appl. No.: 09/416,806

(22) Filed: Oct. 13, 1999

Related U.S. Application Data

(62) Division of application No. 09/032,871, filed on Mar. 2, 1998, now Pat. No. 6,068,018.

(51) Int. Cl.⁷ ................................................. B21K 1/22
(52) U.S. Cl. ................................ 29/888.4; 29/890.123
(58) Field of Search ............................. 29/888.4, 888.42, 29/888.46, 890.123, 890.131; 427/284, 275, 287, 327, 328; 251/214, 326, 327, 328, 329; 123/188.3

(56) References Cited

U.S. PATENT DOCUMENTS

| | | | |
|---|---|---|---|
| 2,627,259 | * | 2/1953 | Wood et al. . |
| 2,745,777 | * | 5/1956 | Clarke, Jr. .......................... 123/188.3 |
| 4,867,116 | * | 9/1989 | de Freitas Couto Ros ........ 29/188.3 |
| 4,916,789 | * | 4/1990 | Robinson ........................ 29/890.123 |
| 5,441,024 | * | 8/1995 | Wietig ............................... 123/188.3 |
| 5,674,111 | * | 10/1997 | Harada ................................. 29/888.4 |

* cited by examiner

Primary Examiner—I Cuda Rosenbaum
(74) Attorney, Agent, or Firm—Michael A. O'Neil

(57) ABSTRACT

A valve stem has a thickness of hardfaced material on its outer diameter in the area contacting the stem packing where the seal is formed which prevents corrosion, erosion and/or scratching of the valve stem, thereby preventing formation of leak paths.

10 Claims, 6 Drawing Sheets

METHOD OF MAKING A VALVE STEM

This application is a Divisional of Ser. No. 09/032,871 filed Mar. 2, 1998 U.S. Pat. No. 6,068,018.

TECHNICAL FIELD

The present invention relates generally to valves of the type used in the petrochemical, refining, and other industries, and more particularly to an improved valve stem which is resistant to chemical and mechanical deterioration, and to a method of manufacturing the valve stem.

BACKGROUND AND SUMMARY OF THE INVENTION

Perhaps the most common valves used in the petrochemical, refining, and other industries are gate valves. Major components of gate valves include a body, a valve stem, a sealing member, and seat rings which are engaged by the sealing member to close the valve. Because the valve stem must extend from inside the valve body to outside the body, a stem packing must be installed to effectively seal between the body and the valve stem, thereby containing the product inside the piping system of which the valve is a part. To achieve the necessary dynamic seal to both contain the product within the piping system and allow the valve stem to actuate up and down, the area of the valve stem which makes contact with the stem packing must be smooth, round and have no taper on the outside surface of the valve stem.

When the valve is new, the foregoing conditions are met and product inside the piping system is prevented from leaking to the outside. As the valve ages, chemical corrosion from the product, galvanic corrosion from the packing, and erosion and corrosion from atmospheric conditions all combine to reduce the smoothness of the valve stem that is necessary to maintain the seal. Also, roughness of the valve stem can occur as the valve stem is pulled through the stem packing during normal cycling due to abrasive materials accumulating between the valve stem and the seal. Any of these factors, and particularly combinations thereof, can result in leak paths being created and leakage to occur. This is unsatisfactory for numerous reasons, the most important of which involves increasing enforcement of the federal Clean Air Act which makes prevention of leakage or "fugitive emissions" essential.

Previous attempts at solving the foregoing problems have included the application of the material sold under the trademark "HASTALLOY"®. Such material is partially effective in slowing valve stem deterioration due to chemical attack but is ineffective as to mechanical degradation of the valve stem surface.

While the prior art discloses a variety of valves, no prior disclosure shows a device where leakage is prevented by way of an overlay on the valve stem in the area of the stem packing. The improved valve stem of the present invention departs from the design of prior valve stems, and in doing so, provides a valve which prevents leakage and fugitive emissions as the valve ages.

SUMMARY OF THE INVENTION

The present invention provides an improved valve in which the valve stem has an overlay of hardfaced material that reduces the deterioration of the stem packing sealing surface. The hardfaced overlay is constructed of materials which resist corrosion, erosion, and scratching, thus eliminating the cause of most defects in the sealing surface of the valve stem. This in turn allows maintaining the original packing area finish, thereby preventing the creation of leak paths through the stem packing and fugitive emissions from the valve.

In accordance with more specific aspects of the invention, the portion of the valve stem that engages the sealing material has a nominal outside diameter which is first reduced, either during manufacture or modification of the valve stem. Hardfaced material is applied to the reduced diameter portion of the valve stem until the diameter thereof is increased beyond the nominal size. The diameter of the hardfaced material is next reduced to the nominal size, thus providing a valve stem that is smooth, hard, and resistant to chemical and mechanical deterioration.

BRIEF DESCRIPTION OF DRAWINGS

A more complete understanding of the invention may be had by reference to the following Detailed Description when taken in conjunction with the accompanying Drawings, in which.

DETAILED DESCRIPTION

Figure 1:
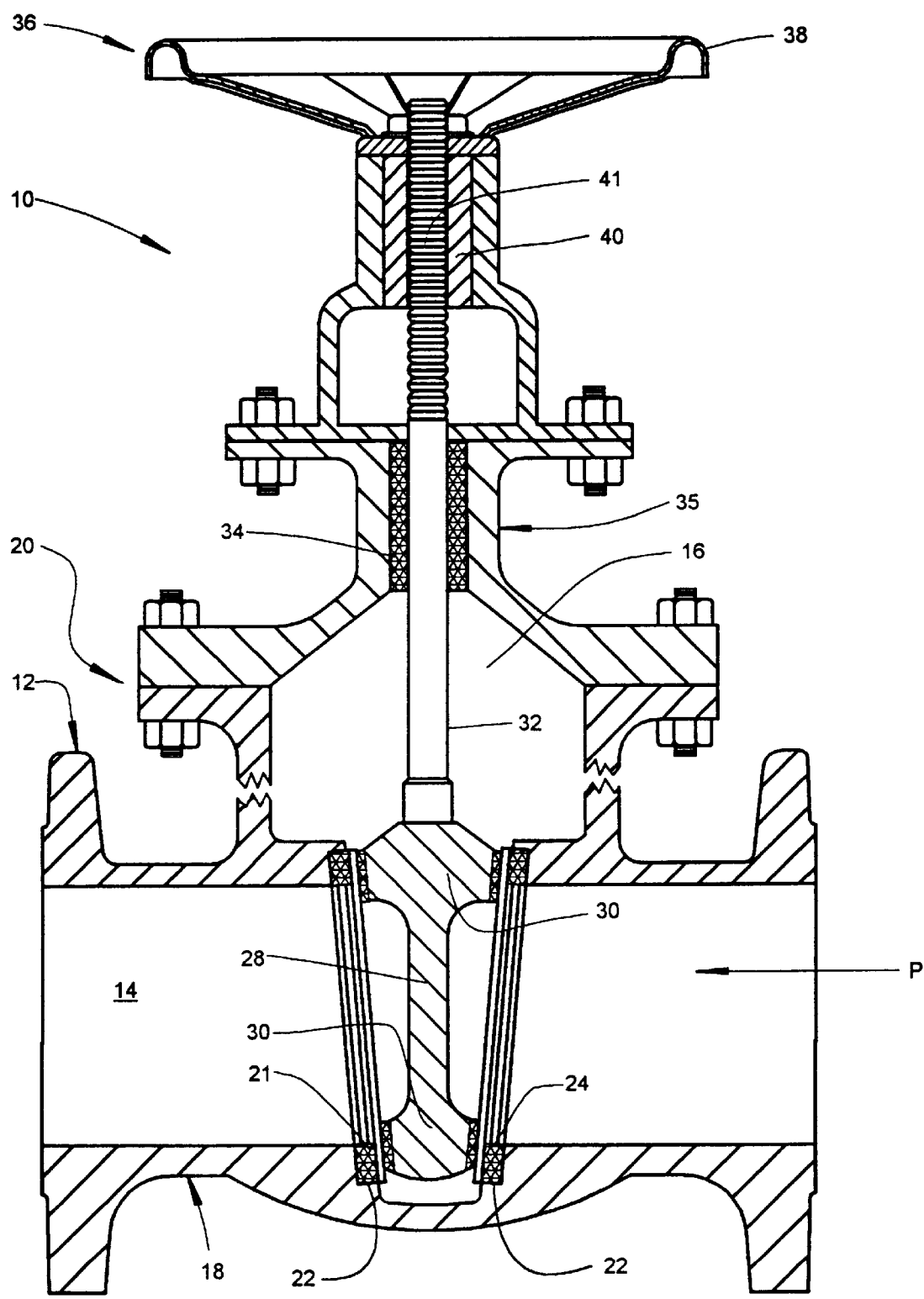
FIG. 1 is a sectional view of a gate valve having a valve stem constructed in accordance with the invention.

Referring now to the Drawings, and in particular to FIG. 1 thereof, there is shown an improved valve 10 having a body 12 constructed to provide a fluid path 14 and a body cavity 16. The fluid path 14 is generally located in the lower end 18 of body 12, while the cavity 16 extends from the upper end 20 of body 12 to the location of the fluid path 14. Disposed within the fluid path 14 are seat ring recesses 22 and seat rings 24 mounted in the seat ring recesses 22.

A valve member 28 is slidably positioned in the body 12 for movement through the cavity 16 such that sealing portions 30 of the valve member 28 may engage the seat rings 24. The valve member 28 is operably connected to a valve stem 32 which extends through a stem packing 34 located between the cavity 16 and a bonnet 35 mounted on the body 12.

The valve member 28 is actuated between the open and closed positions by an actuating member 36. The improved valve 10 is in the open position when the valve member does not engage the seat rings 24, and is in the closed position when the sealing portions 30 of the valve member 28 engage the seat rings 24 thereby completely restricting the flow of product P within the fluid path 14. The valve member 28 can be any member used to restrict or close flow through the improved valve 10, but in the preferred embodiment the valve member 28 is a wedge.

As shown in FIG. 1, the actuating member 36 may comprise a handwheel 38 secured to a threaded portion 41 of the valve stem 32. The threaded portion 41 is threadingly engaged with a nut 40 which is secured against rotation. As the handwheel 38 is turned clockwise, the nut 40 and the threaded portion 41 cause the valve member 28 to move downward until the valve 10 is in the closed condition. If the handwheel 38 is rotated counterclockwise, the nut 40 and the threaded portion 41 effect opening the valve 10. Although not shown, other actuating members well known in the art are also within the scope of this invention.

As the valve member 28 is moved during the opening and closing of the valve 10, the valve stem 32 slidingly engages the stem packing 34. The stem packing 34 is installed such that when the valve stem 32 slidingly engages the stem packing 34, a dynamic seal is effectively formed between the body 12, the bonnet 35, and the valve stem 32. The seal contains the product P found within the piping system of which the valve 10 is a part.

As the valve stem 32 moves up and down through stem packing 34, problems arise in the prior art because as the valve stem 32 ages, chemical corrosion from the product, galvanic corrosion from the stem packing 34, and both corrosion and erosion from the atmosphere cause a normal valve stem to lose the smoothness necessary to prevent damage to the stem packing 34, which causes a leak path to form. Also, abrasive materials accumulating between the packing and the stem can cause scratching of the surface of the valve stem, also causing leak paths. In severe cases, chemical and mechanical deterioration occur in combination.

Figure 2:
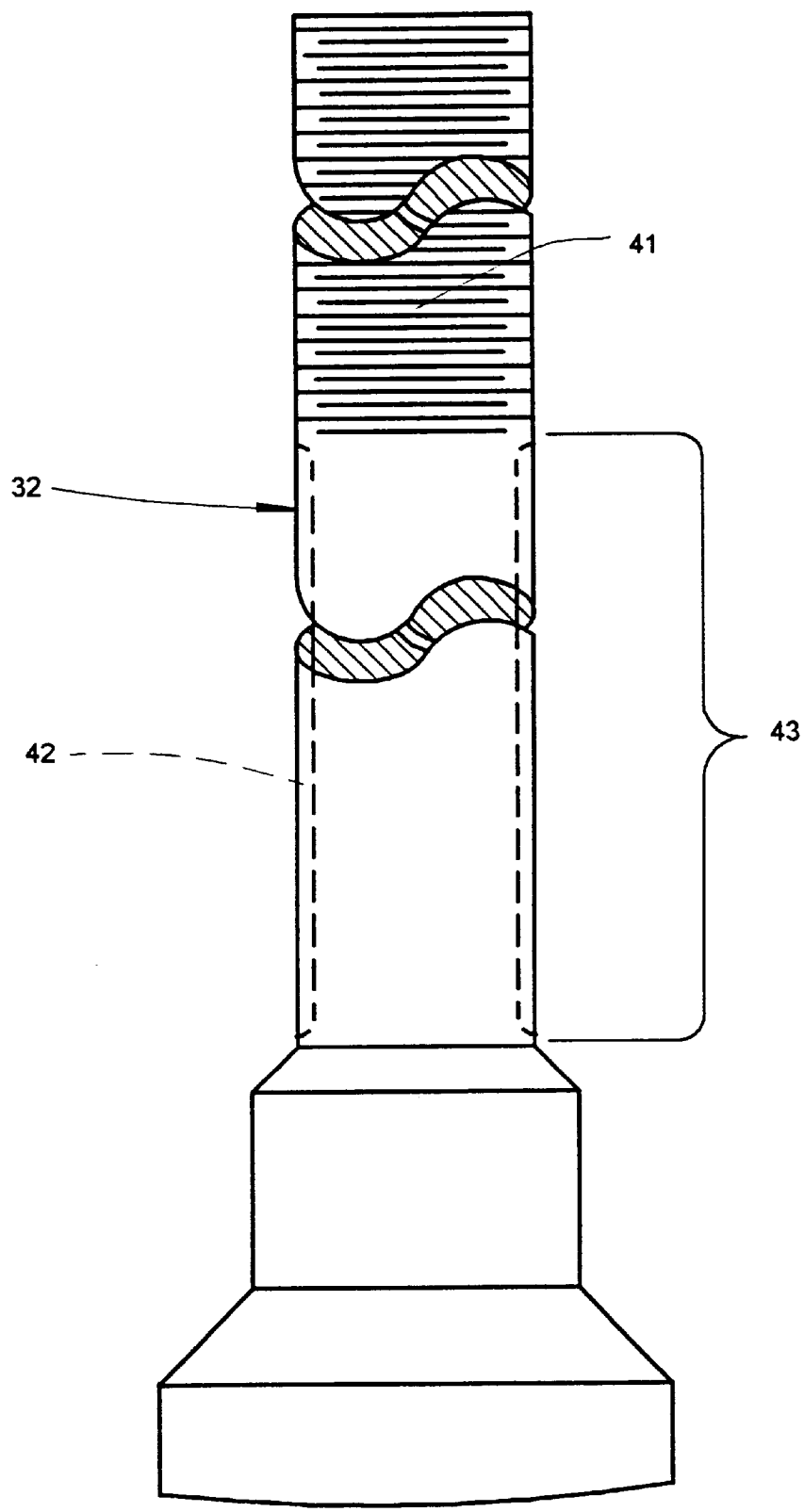
FIG. 2 is a side view of the improved valve stem of the invention.
Figure 3:
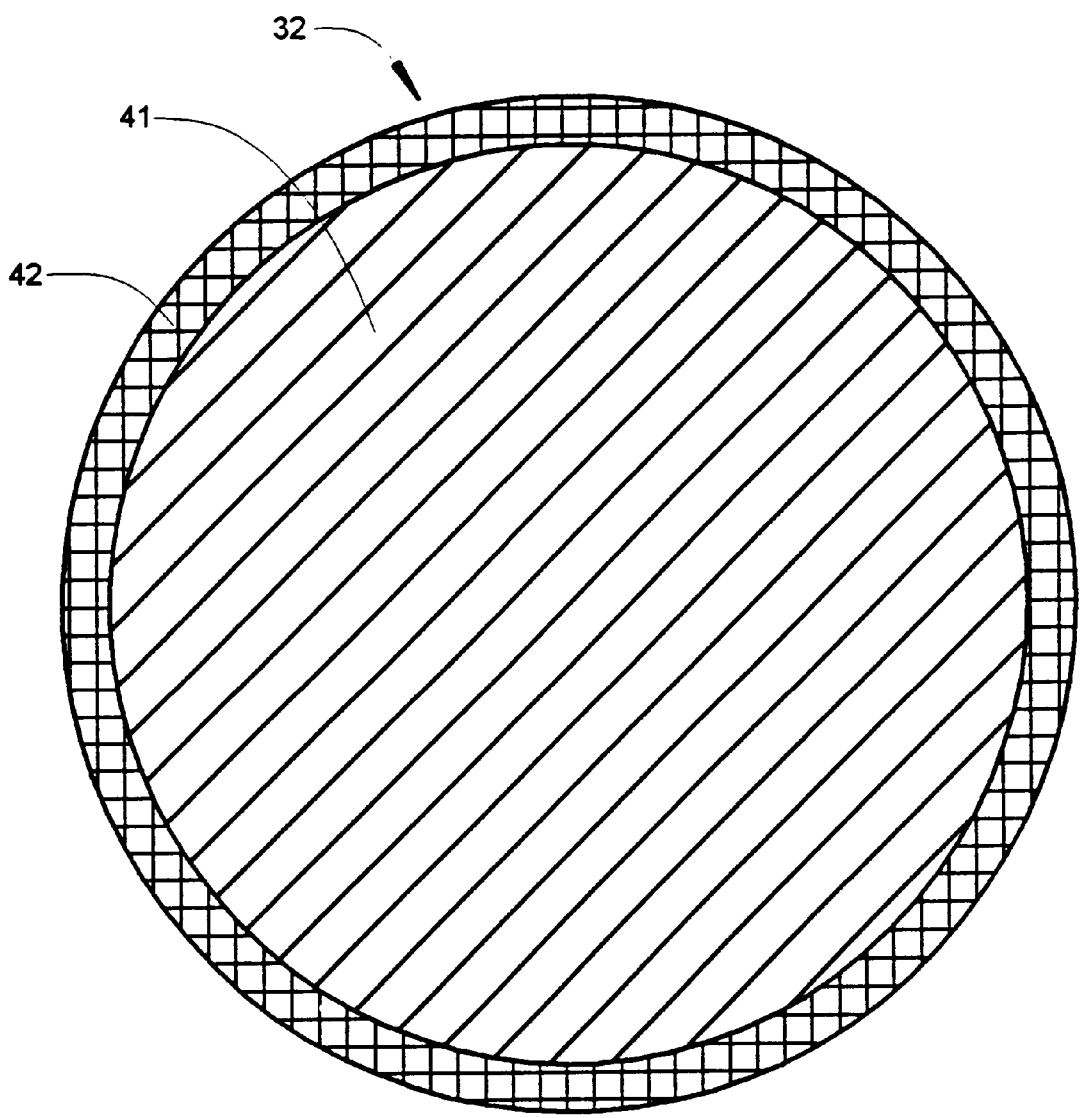
FIG. 3 is a cross-sectional view of the valve stem of FIG. 2.

As shown in FIG. 2, this problem is remedied by a thickness of hardfaced material 42 on the section 43 of the outside diameter of the valve stem 32 which slidably engages the stem packing 34. The hardfaced material is a material resistant to corrosion, erosion, and scratching and includes materials with Brinell hardness numbers ranging from 220 to 380, such as Stoody® 6 manufactured by Stoody Company, 5557 Nashville Road, Bowling Green, Ken. 42101-7546, and Stellite® 6 and Stellite® 21 manufactured by Deloro Stellite, Inc., 471 Dundas St. E. Belleville, Ontario, Canada K8N 1G2. Materials with Brinell hardness numbers approximately 220 and below lack the required hardness to resist corrosion, erosion or scratching, while materials with Brinell hardness approximately 380 and above create problems in the machining process because they are very hard to machine and cause maintenance problems for the machining equipment. In the preferred embodiment, the hardfaced material 42 comprises either Stellite® 6 or Stellite® 21 with a Brinell number range of 320–380.

For an existing valve stem, the hardfaced material 42 is placed on the valve stem 32 by the following process. First, the outside diameter of an existing valve stem is machined down approximately 0.120 inches using a conventional machine tool. Next, the outside diameter of the valve stem 32 is built back up using a gas metal arc welding (GMAW) process to produce a section of hardfaced material 42 having an approximate total thickness of 0.200 to 0.250 inches. The now oversized valve stem 32 is machined back to its original diameter and may be polished required by particular applications of the invention. In the preferred embodiment using Stellite® 21, the finished valve stem 32 has a section of hardfaced material 42 having a thickness of approximately 0.090 inches. Other embodiments will call for a larger or smaller thickness ranging from 0.010 to 0.125 inches of hardfaced material 42. The exact thickness required for a particular application will depend upon the requirements of particular applications of the invention and/or by the corroded and scratched condition of the valve stem sought to be fitted with the thickness of hardfaced material.

The hardfaced material may also be applied using the plasma transfer arc (PTA) process. In the PTA process one or more powders, which may include metals and/or metallic salts and/or non-metallic materials, are directed into a plasma which melts the powdered material prior to transfer to the surface being treated. The use of the PTA process to apply the hardfaced material is beneficial in that the composition of the hardfaced material can be matched to the requirements of particular applications of the invention.

A new valve stem with a thickness of hardfaced material 42 and having a known diameter can be produced by the following method. First, a base material, such as stainless steel in the preferred embodiment, is forged or molded into a base stem having a diameter smaller than the nominal diameter, at least in the region that engages the packing. The molding process can be done by any method known in the art for forging, casting and/or molding metal. The diameter of the base stem will usually range between 0.010 to 0.125 inches smaller than the nominal diameter. In the preferred embodiment using Stellite® 6 or Stellite® 21, the diameter of the base stem will be 0.090 inches smaller than the known diameter. The diameter of the base stem can be varied according to the requirements of particular applications of the invention.

Once the base stem has been molded, hardfaced material 42, such as that previously disclosed, is welded onto the base stem until the diameter is greater than the nominal diameter. This can be done by the use of a gas metal arc welding (GMAW) process, providing an approximate total thickness of 0.125 to 0.250 inches of hardfaced material 42. The now oversized valve stem is machined back to its nominal diameter and polished. As in the preferred embodiment using Stellite® 6 or Stellite® 21, the finished valve stem has a thickness of hardfaced material of approximately 0.090 inches. Other embodiments will call for a larger or smaller thickness ranging from about 0.010 inches to about 0.125 inches of hardfaced material. The exact thickness required for a particular application will be dictated by the requirements of particular applications of the invention.

The hardfaced material may also be applied using the plasma transfer arc (PTA) process. In the PTA process one or more powders, which may include metals and/or metallic salts and/or non-metallic materials, are directed into a plasma which melts the powdered material prior to transfer to the surface being treated. The use of the PTA process to apply the hardfaced material is beneficial in that the composition of the hardfaced material can be matched to the requirements of particular applications of the invention.

Figure 4:
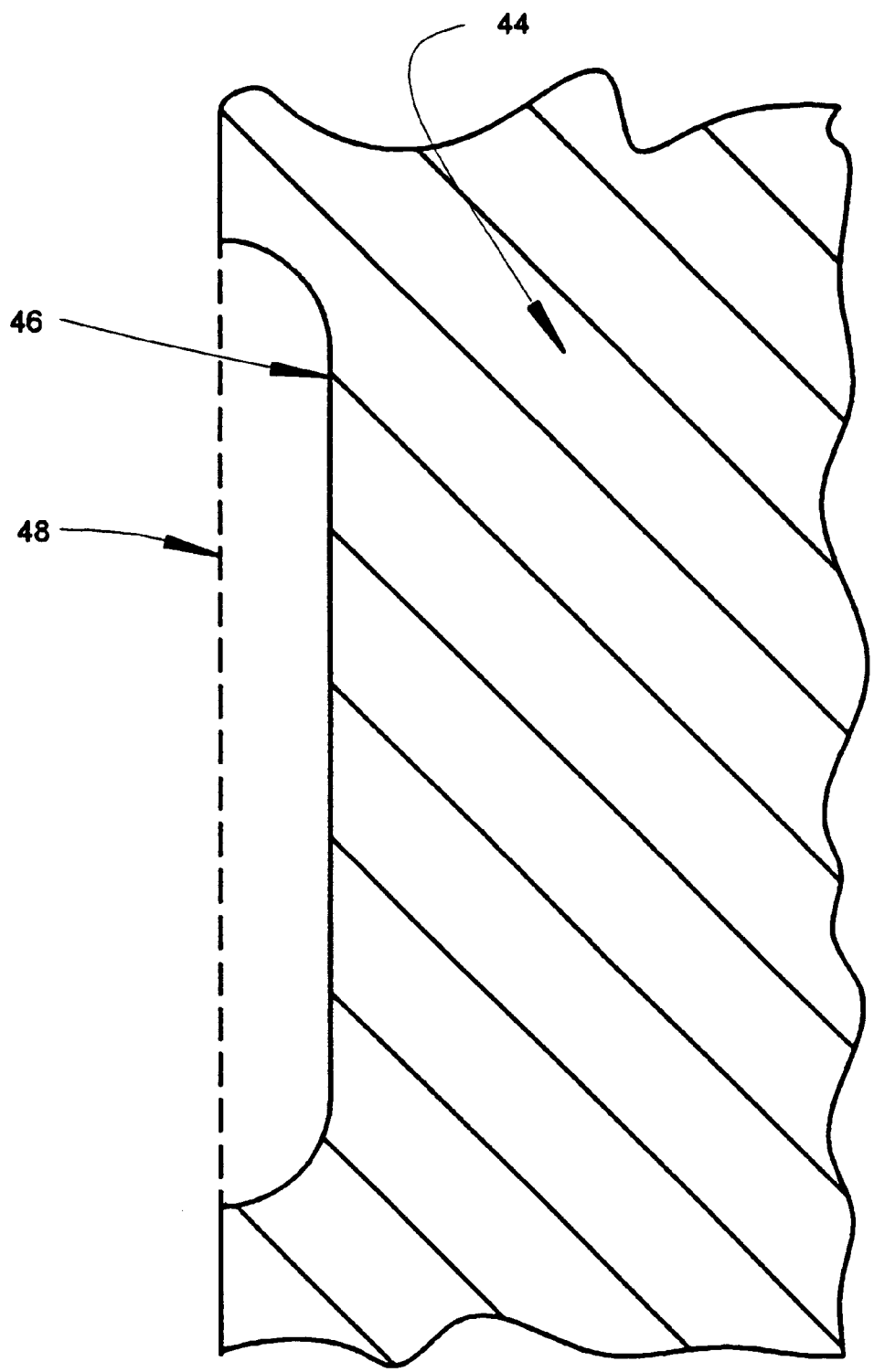
FIG. 4 is an illustration of a first step in the method of the invention.
Figure 5:
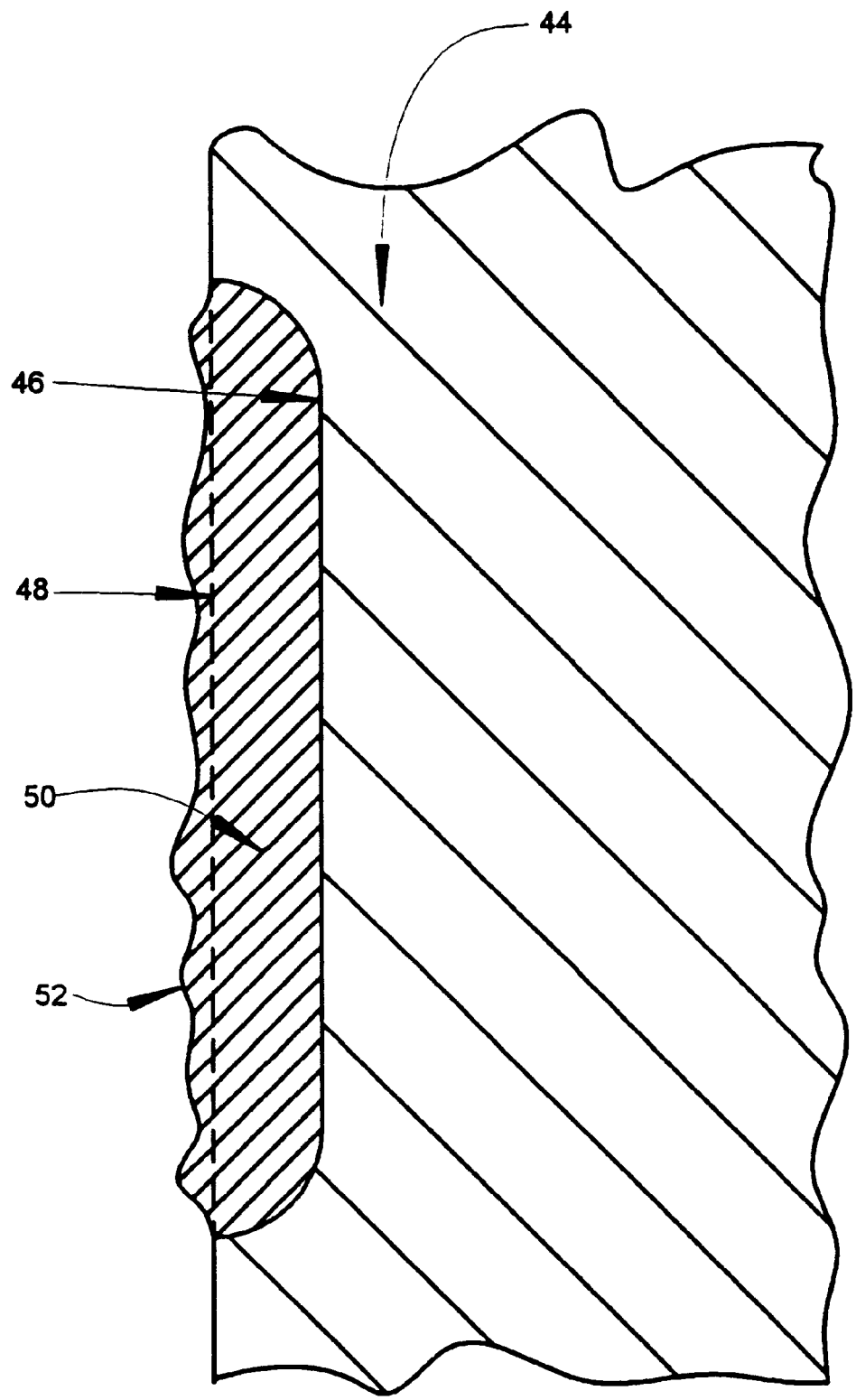
FIG. 5 is an illustration of a later step in the method of the invention.
Figure 6:
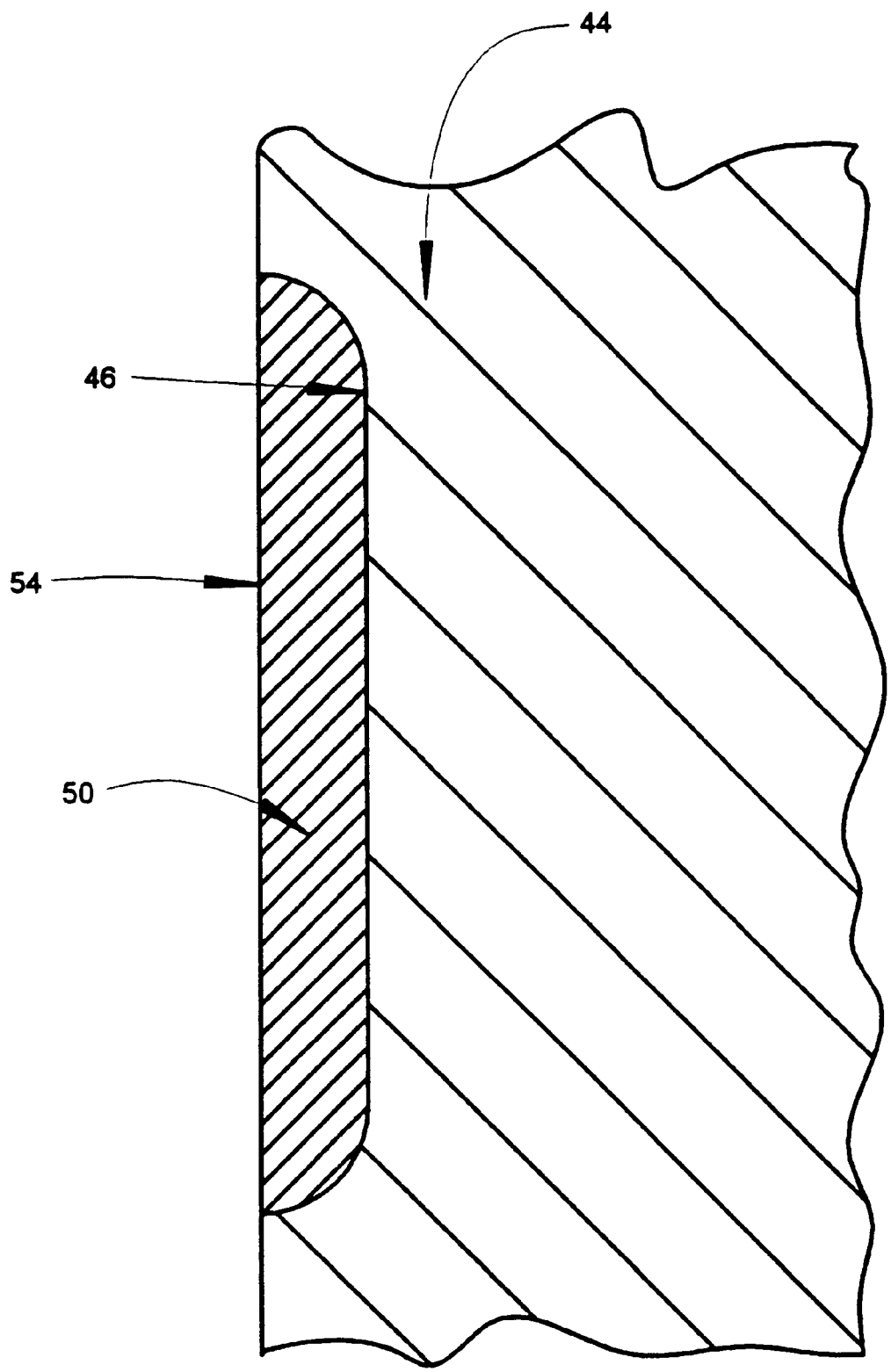
FIG. 6 is an illustration of a still later step in the method of the invention.

Referring to FIGS. 4, 5, and 6, the method of the present invention is illustrated. A valve stem 44 is provided with a portion 46 having a reduced diameter relative to the nominal diameter 48 of the valve stem. The reduced diameter portion comprises the area of the valve stem 44 which engages the seal of the valve. The reduced diameter portion 46 may be provided either in the original manufacture of the valve stem 44, or by grinding or otherwise machining a preexisting valve stem to provide the reduced diameter portion 46.

The reduced diameter portion 46 is filled with a layer of hardfaced material 50 which is applied to and secured to the valve stem 44 by welding. The welding of the hardfaced material 50 continues until the outer surface 52 thereof extends beyond the nominal diameter 48 of the valve stem 44. Thereafter, the hardfaced material is ground and polished to provide an exterior surface 54 thereof which is coincident with the nominal diameter 48 of the valve stem 44.

Although preferred embodiments of the invention are illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. A method for producing a hardfaced valve stem from an existing valve stem having a first diameter comprising the steps of:
    a. machining a section of said existing stem to a second diameter, said second diameter being less than said first diameter;
    b. welding sufficient hardfaced material to said section to increase said second diameter to a third diameter greater than said first diameter; and
    c. machining said section to reduce said third diameter to approximately equal said first diameter.

2. The method according to claim 1 further comprising the step of polishing said section.

3. The method according to claim 2 wherein said hardfaced material is selected from a group of materials consisting essentially of one or more materials having a Brinell hardness number between 220 and 380.

4. The method according to claim 1 wherein said hardfaced material is selected from a group consisting essentially of Stellite® 6, Stellite® 21, or combinations thereof, and having a thickness between 0.010 inches and 0.125 inches.

5. The method according to claim 4 wherein said predetermined thickness is about 0.090 inches.

6. A method for producing a new valve stem of a predetermined diameter comprising a base material with a thickness of hardfaced material secured thereto comprising the steps of:
    a. molding said base material into a base stem having a diameter less than said predetermined diameter;
    b. welding sufficient said hardfaced material to said base stem to increase the diameter of said base stem to greater than said predetermined diameter; and
    c. machining said base stem to a sufficient amount to reduce its diameter to said predetermined diameter.

7. The method according to claim 6 further comprising the step of polishing said hardfaced material.

8. The method according to claim 6 wherein said hardfaced material is selected from a group consisting essentially of one or more materials having a Brinell hardness number between 220 and 380.

9. The method according to claim 8 wherein said hardfaced material has a thickness between about 0.010 inches and about 0.125 inches, and is constructed from Stellite® 6, Stellite® 21, or combinations thereof.

10. The method according to claim 9 wherein said predetermined thickness is about 0.090 inches.

* * * * *